United States Patent [19]

Fanciullo

[11] Patent Number: 5,235,846
[45] Date of Patent: Aug. 17, 1993

[54] FUEL CELL LEAKAGE DETECTION TECHNIQUE

[75] Inventor: Salvatore Fanciullo, Plainville, Conn.

[73] Assignee: International Fuel Cells Corporation, South Windsor, Conn.

[21] Appl. No.: 814,162

[22] Filed: Dec. 30, 1991

[51] Int. Cl.$^5$ ............................................. G01M 3/20
[52] U.S. Cl. ..................... 73/40.7; 73/19.1; 429/13; 429/90
[58] Field of Search ............ 73/40.7, 40.5 R, 40, 73/19.1; 429/13, 90

[56] References Cited

U.S. PATENT DOCUMENTS

| | | | |
|---|---|---|---|
| 4,314,029 | 2/1982 | Ohtake et al. | 435/291 |
| 4,551,425 | 11/1985 | Zemel | 435/4 |
| 5,010,776 | 4/1991 | Lucero et al. | 73/863.23 |
| 5,153,141 | 10/1992 | Hobbs | 73/19.1 X |

FOREIGN PATENT DOCUMENTS 100630  5/1986  Japan ............................. 73/40.5 R Primary Examiner—Hezron E. Williams
Assistant Examiner—Joseph W. Roskos
Attorney, Agent, or Firm—Pamela J. Curbelo

[57] ABSTRACT

Cross-over leakage in fuel cells is determined by comparing the concentration of carbon dioxide in the oxidant inlet stream and cathode effluent. The amount of carbon dioxide in the oxidant stream of a fuel cell should remain constant, barring leakage problems. Therefore, if the carbon dioxide concentration changes, a leakage problem exists. Since this process is in-line, the staff operating the fuel cell stack is virtually immediately alerted to a potential leakage problem.

8 Claims, 1 Drawing Sheet

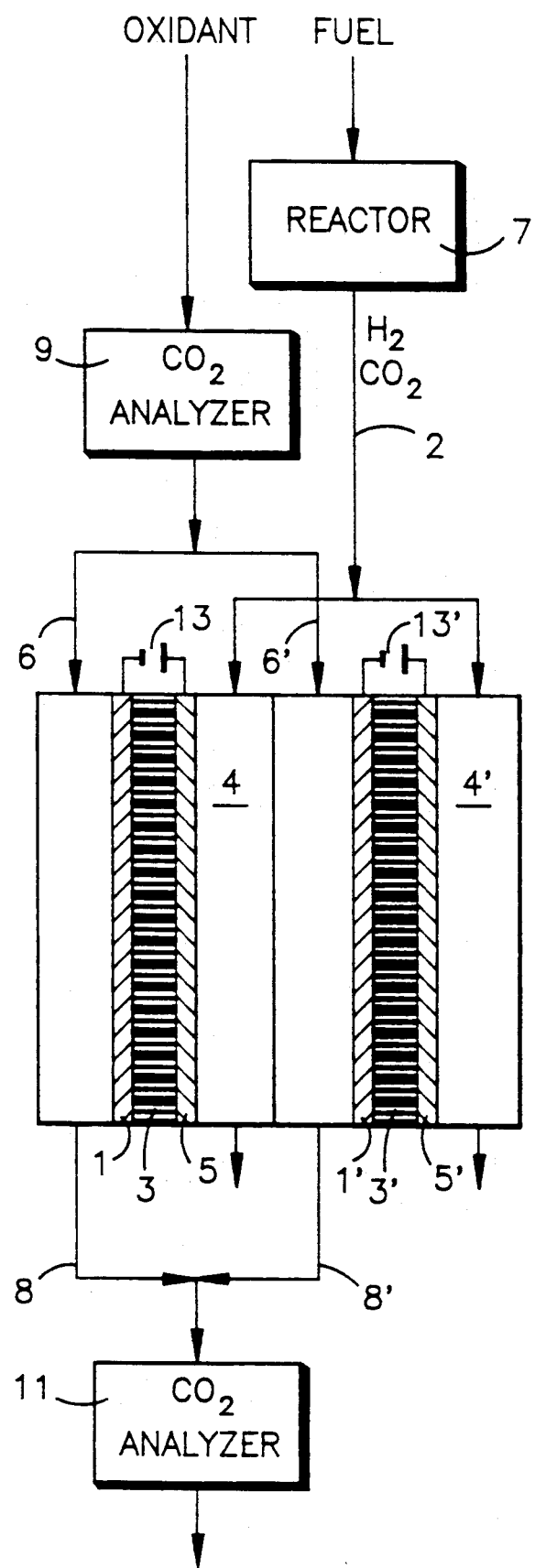

FUEL CELL LEAKAGE DETECTION TECHNIQUE

TECHNICAL FIELD

The present invention relates to detecting leakage of fuel and/or oxidant in fuel cells, and especially relates to monitoring the carbon dioxide content of the oxidant stream to detect such leakage.

BACKGROUND ART

Power plants often employ fuel cell stacks in the production of electricity. These fuel cell stacks comprise a grouping of individual fuel cells, each including an anode, a cathode, and an electrolyte in the form of a matrix disposed therebetween. Also included in the fuel cell stacks are passageways to and from the anode and the cathode to permit the in flow of fuel and oxidant to the anode and cathode respectively, and the out flow of any excess fuel and oxidant, and of byproducts such as water.

Operation of the fuel cell stack to produce electricity includes introducing a fuel such as hydrogen into the anode passageway. Meanwhile, an oxidant such as air is introduced into the cathode passageway. Oxidation of hydrogen occurs at the anode to produce hydrogen ions and free electrons. These electrons flow through an external load, thereby producing electricity, while the hydrogen ions migrate through a matrix to the cathode. At the cathode, the hydrogen ions and free electrons react with the oxygen to form water.

The passageways directing fuel to the anode and oxidant to the cathode are separate and distinct. Since mixing of the fuel and oxidant can result in direct combustion or an explosion, it is imperative to keep these substances separate. As a result, it is important to detect leakage which will allow direct contact between these substances, either over-board leakage or cross-over leakage. Overboard leakage is leakage from the passageways out of the cell which occurs while the fuel and oxidant are being directed to the anode and cathode. cross-over leakage is leakage between the anode and cathode through the matrix within the cells which occurs when a hole develops in the matrix.

Leakage detection has been accomplished using various techniques. One such technique requires monitoring the performance of the cell stack. If performance is low, there may be a failure to direct all of the fuel and/or oxidant to the anode and cathode respectively. Therefore, in order to determine the cause of the poor performance, the operation of the fuel cell stack must be ceased. The individual fuel cells are then examined for leaks using an elaborate, time consuming pressure decay test. This test requires disconnecting the fuel cell, blocking the passageways, filling the fuel cell with inert gas, and utilizing a flow meter to determine if there is any flow and therefore any leaks in the fuel cell. Although this technique detects leakage problems, the problem must be significant in order to be detected and therefore when leaks are detected the situation is critical. This performance monitoring technique fails to detect leakage in its early stages.

Another technique which similarly fails to detect leakage problems sufficiently early to prevent a hazardous situation, is a method of monitoring the sensitivity of the fuel cell stack or individual fuel cells for changes in fuel or oxidant utilization. This technique requires monitoring the performance of the fuel cell stack as excess fuel and then excess oxidant is introduced. Increased performance during either of these introductions signifies leakage. The individual fuel cells can then be monitored to determine exactly which fuel cell is experiencing the leakage by monitoring individual fuel cells for changes in fuel or oxidant utilization. Although this leakage is discovered, the type of leakage remains unknown. This technique can not predict or detect a leakage problem in its early stages before the fuel cell has reached an unsafe condition.

A third technique similarly failing to predict leakage problems is a process of monitoring the fuel cell stack temperature. When cross-over leakage occurs, fuel and oxidant mix together, thereby causing a direct exothermic reaction between the fuel and oxidant. As a result, the temperature of the fuel cell stack increases. Accordingly, a temperature rise in the fuel cell stack or cooling system signifies a cross-over leakage problem. Although this is a simple manner of detecting leakage problems, it is limited by the fact that a significant failure is required in order for a rise in temperature to be detectable. As with the detection techniques discussed above, the fuel cell stack is unsafe by the time the problem is detected.

What is needed in the art is a simple, in-line detection system which monitors leakage, thereby allowing critical conditions to be predicted and shutdown to occur before such a condition has been reached.

DISCLOSURE OF THE INVENTION

The present invention relates to a method for detecting cross-over leakage in a fuel cell stack. This method comprises comparing the amount of carbon dioxide present in the oxidant stream entering the fuel cell stack and in the cathode effluent exiting the fuel cell stack. A difference in the amount of carbon dioxide signifies that carbon dioxide has passed through a hole in the matrix from the anode to the cathode in at least one fuel cell within the fuel cell stack.

Further disclosed is an apparatus for detecting cross-over leakage in a fuel cell stack. This apparatus comprises a first means for determining carbon dioxide concentration in the oxidant stream entering the fuel cell stack, a passageway for directing the oxidant stream to the cathode, a passageway for directing the oxidant from the cathode out of the fuel cell as cathode effluent, a means for combining the cathode effluent from each of the individual fuel cells, a second means for determining the carbon dioxide concentration in the combined cathode effluent.

Other features and advantages will be apparent from the specification, drawing, and claims which illustrate an embodiment of the present invention.

BRIEF DESCRIPTION OF THE DRAWING

The figure represents one embodiment of the apparatus of the present invention for detecting cross-over leakage in a fuel cell stack.

BEST MODE FOR CARRYING OUT THE INVENTION

Within a fuel cell stack, leakage of fuel and/or oxidant can occur between the anode and the cathode through the matrix. If the fuel cell stack is not experiencing leakage problems, the oxidant stream will contain a constant amount of carbon dioxide from the time the oxidant stream enters the fuel cell stack until it exits because carbon dioxide is not produced or introduced to the oxidant stream. But, carbon dioxide is a byproduct of a conversion reaction in a reactor which reduces hydrocarbon fuels in the fuel stream to hydrogen. As a result, a large amount of carbon dioxide is present in the fuel stream as it enters the fuel cell stack and the anode. Therefore, if there is a failure in the matrix, such as a hole which forms a passageway between the anode and the cathode, carbon dioxide in the fuel stream will pass from the anode through the hole in the failed matrix to the cathode and into the oxidant stream, thereby increasing the concentration of carbon dioxide in that stream. Consequently, if the concentration of carbon dioxide in the oxidant stream is greater when the oxidant stream exits the fuel cell stack than when it entered, there is evidence of a leak between the anode and the cathode.

Additionally, since the carbon dioxide molecules are larger than hydrogen molecules, if leakage of carbon dioxide through the membrane has been determined, leakage of the hydrogen is essentially assured, creating a dangerous situation wherein the hydrogen crossing over could react with the oxidant and cause a spontaneous explosion.

Detection of cross-over leakage using carbon dioxide concentration is a simple process which is capable of predicting problems before unsafe conditions have been reached. Referring to the Figure, a gas or liquid hydrocarbon fuel such as natural gas, propane, naphtha, or hydrogen, among others, is converted to hydrogen and carbon dioxide prior to being introduced to a fuel cell stack. The hydrogen conversion occurs when the hydrocarbon fuel is introduced to a conventional reactor 7 capable of converting hydrocarbon fuel to hydrogen and carbon dioxide. Possible conventional reactors useful with the present invention include a steam reformer and a sensible heat reformer, among others. For example, hydrocarbon fuel and steam are introduced to a steam reforming reactor. Within the reactor, the hydrocarbon fuel and steam contact a catalyst causing a chemical reaction which produces hydrogen and carbon dioxide. Typically, this reactor is maintained between about 1000° C. and about 1200° C.

The effluent stream 2 from the reactor typically contains the hydrogen and often greater than about 250,000 parts per million by volume (ppm) carbon dioxide. This effluent stream 2 is directed to the fuel cell stack and further directed via passageways 4, 4' to the anode 5, 5'. At the anode 5, 5', the hydrogen gas is ionized to hydrogen ions and free electrons. The free electrons move through and external circuit 13, 13' to the cathode 1, 1', thereby producing electricity. Meanwhile, the hydrogen ions migrate across the matrix 3, 3' to the cathode where they are reacted with oxygen and free electrons to produce water.

Concurrent to the conversion of the hydrocarbon fuel to hydrogen and carbon dioxide, a baseline measurement is taken of the carbon dioxide concentration of an oxidant stream 6, 6' being introduced to the cathode side of the fuel cell. The baseline measurement of the carbon dioxide concentration can be taken with any conventional carbon dioxide detection means 9, 9' as is discussed below. This baseline measurement will be utilized later to determine if any leakage has occurred.

Once the oxidant stream 6, 6' has reached the cathode 1, 1', the oxidant, typically oxygen, chemically reacts with the hydrogen ions which have crossed the matrix 3, 3' and the free electrons which have moved through the external circuit 13, 13' to form water. The oxidant stream then continues through the cathode and exits as cathode effluent 8, 8'.

This cathode effluent 8, 8' is monitored to determine if there has been an increase in carbon dioxide concentration as the oxidant stream 6, 6' passed through the fuel cell stack. Since carbon dioxide was not produced within the fuel cell, additional carbon dioxide in the cathode effluent 8, 8' indicates either migration of carbon dioxide across the matrix 3, 3' from the anode 5, 5' to the cathode 1, 1' or that there is a hole in the matrix 3, 3' allowing carbon dioxide to pass through the matrix 3, 3' from the anode 5, 5' to the cathode 1, 1'.

If the increase in the carbon dioxide concentration is negligible, less than about 300 ppm by volume, then the increase can be attributed to migration of the carbon dioxide across the matrix 3, 3'. However, if the increase in the carbon dioxide concentration is greater than about 300 ppm by volume, the increase is attributable to a hole in the matrix which allows carbon dioxide to pass through the matrix as opposed to migrating across the matrix. According to the degree of increase in carbon dioxide concentration, the extent of the failure of the matrix can be approximated, thereby allowing prediction of when the fuel cell stack will reach an unsafe condition and when shutdown is most efficient.

As with the oxidant inlet, monitoring the carbon dioxide concentration of the cathode effluent 8, 8' can be accomplished in various conventional fashions. Possible monitoring techniques include a condensation method, employment of various infrared devices, such as a non-dispersive infrared analyzer, and using a gas chromatograph, mass spectrometer, flame ionization detector, or other conventional device 11.

The condensing method requires cooling of the cathode effluent 8, 8' to at least the dew point of water and generally to room temperature, approximately 25° C., for reasons of convenience of handling. The condensate is then titrated to determine the carbon dioxide level.

The gas chromatograph, on the other hand, requires passing the cathode effluent 8, 8' through an absorption column; a tube filled with absorbent material. Substances in the cathode effluent 8, 8' take various lengths of time (reaction times) to pass through the absorbent material. Since the retention time varies according to specific species, certain species are detected according to the time required to pass through the adsorption column. This enables the carbon dioxide to be detected. Any monitoring device capable of detecting the amount of carbon dioxide present can be used. A common detection device is a thermal conductivity detector which identifies the passage of carbon dioxide in effluent gas by the change in thermal conductivity.

Another method for analyzing the amount of carbon dioxide in the cathode effluent 8, 8' consists of using a flame ionization detector. This detector operates on the theory that the electrical conductivity of a gas is directly proportional to the concentration of charged particles within the gas. Therefore, the cathode effluent 8, 8' is mixed with hydrogen and burned in air. As the carbon dioxide enters the flame, it is ionized to form positive and negative ions, and free electrons. The positive ions are attracted by a collector having a negative potential, typically approximately minus 50 volts direct current (VDC), thereby causing a current flow. The current flow at the collector affects the input to an electrometer connected to the collector. The electrometer converts the current flow to voltage which is proportional to the, amount of carbon dioxide in the cathode effluent 8, 8'.

Yet another carbon dioxide concentration monitoring method employs an infrared detection scheme. A detector converts the difference in energy between couple and reference cells to an electronic signal equivalent to the carbon dioxide concentration. This signal is amplified and indicated on a meter, and if desired, used to drive a recorder and/or a controller. In these schemes, two infrared beams of desired frequency are produced by processing light from an energy source through an optical grating or prism system.

It should be noted that efficiency dictates monitoring the carbon dioxide in the combined cathode effluent from all of the fuel cell stacks in a fuel power plant. When an increase in carbon dioxide is detected, the cathode effluent of each cell stack is monitored to determine which individual cell stack is experiencing the leakage problem. Once the problem has been narrowed to one cell stack, each individual cell within the cell stack experiencing leakage problems may be performance monitored to narrow the problem to an individual cell.

The advantages of the present invention can be readily seen. The prior art fails to detect leakage problems in the early stages, generally requiring the fuel cell to have attained a critical, unsafe state for the leakage to be detectable. Furthermore, once a problem is detected, determination of the type of leak and which cell is leaking is an elaborate, time consuming task.

The present invention detection scheme is in-line and capable of detecting minor leakage problems during operation. Consequently, leakage problems are discovered in the early stages allowing the optimum time to cease fuel cell operation for maintenance to be determined, thereby avoiding hazardous conditions. In addition, the type of leakage detected by the present invention is known to be cross-over leakage. Therefore, additional testing to determine the cause of the problem is not necessary and maintenance time is decreased. Many of the prior art schemes are incapable of determining the type of leakage, cross-over leakage or over-board leakage, thereby requiring additional testing to determine the type of leakage before repairs can begin.

The prior art detection techniques were inefficient, time consuming, often elaborate, and allowed the condition of the fuel cell to become dangerous. In contrast, the present invention is a simple, efficient, and effective leakage detection scheme capable of predicting unsafe fuel cell conditions.

Although this invention has been shown and described with respect to detailed embodiments thereof, it will be understood by those skilled in the art that various changes in form and detail thereof may be made without departing from the spirit and scope of this novel concept as defined by the following claims.

I claim:

1. A method for detecting cross-over leakage in a fuel cell stack, said fuel cell stack having a plurality of fuel cells, each fuel cell having an anode, a cathode, and a matrix disposed therebetween, and an oxidant inlet, and using fuel and oxidant streams, which comprises the steps of:
    a. determining the concentration of carbon dioxide in the oxidant stream entering the fuel cell stack;
    b. directing said oxidant stream to the cathode of each fuel cell;
    c. directing said oxidant stream out of each fuel cell as cathode effluent;
    d. combining said cathode effluent from each fuel cell; and
    e. determining the carbon dioxide concentration in the combined cathode effluent;
whereby an increase of carbon dioxide in the combined cathode effluent signifies a failure in the matrix.

2. A method as in claim 1, wherein the carbon dioxide in the combined cathode effluent is determined by condensing the water in the combined cathode effluent and by measuring the amount of carbon dioxide in the water.

3. A method as in claim 1, wherein the carbon dioxide in the combined cathode outlet is determined using a device selected from the group consisting of infrared detection schemes, gas chromatograph, and mass spectrometer.

4. A method for detecting cross-over leakage in a fuel cell, said fuel cell having an anode, a cathode, and matrix disposed therebetween, and an oxidant inlet, and using fuel and oxidant streams, which comprises the steps of:
    a. determining the concentration of carbon dioxide in the oxidant stream at the oxidant inlet;
    b. directing said oxidant stream to the cathode;
    c. directing said oxidant stream out of the fuel cell as cathode effluent; and
    d. determining the carbon dioxide concentration in the cathode effluent;
whereby an increase of carbon dioxide in the cathode effluent signifies a failure in the matrix.

5. Apparatus for detecting cross-over leakage in fuel cell stacks, said fuel cell stacks having an oxidant inlet, a cathode effluent, and a plurality of fuel cells, said fuel cells each having an anode, a cathode, and a matrix disposed therebetween, comprising:
    a. a first means for determining carbon dioxide concentration in an oxidant stream at the oxidant inlet, said first means for determining carbon dioxide concentration in flow communication with said oxidant stream and with said cathode;
    b. at least one passageway for directing the oxidant stream to the cathode;
    c. at least one passageway for directing the oxidant stream from the cathode out of each fuel cell as cathode effluent;
    d. a means for combining said cathode effluent from each fuel cell into a single cathode effluent stream, said means for combining said cathode effluent in flow communication with the cathode effluent stream of each individual fuel cell; and
    e. a second means for determining carbon dioxide concentration in the combined cathode effluent, wherein said second means for determining carbon dioxide concentration is in flow communication with said means for combining said cathode effluent.

6. An apparatus as in claim 5 wherein said fuel cell stack is a single fuel cell.

7. An apparatus as in claim 5 wherein said second means for determining carbon dioxide concentration is a device selected from the group consisting of infrared detection schemes, gas chromatograph, and mass spectrometer.

8. A method as in claim 5 wherein said second means for detecting carbon dioxide concentration is a condensation method consisting of condensing the water in the combined cathode effluent and measuring the amount of carbon dioxide in the water.

* * * * *

UNITED STATES PATENT AND TRADEMARK OFFICE
CERTIFICATE OF CORRECTION

PATENT NO. : 5,235,846

DATED : August 17, 1993

INVENTOR(S) : Salvatore Fanciullo

It is certified that error appears in the above-identified patent and that said Letters Patent is hereby corrected as shown below:

Column 3, Line 52   After "cathode" insert --1, 1'--

Column 5, Line 1    After "portional to the" delete ","

Signed and Sealed this

Twenty-second Day of March, 1994

Attest:

BRUCE LEHMAN

Attesting Officer   Commissioner of Patents and Trademarks